(12) United States Patent
Wudy et al.

(10) Patent No.: US 8,583,396 B2
(45) Date of Patent: Nov. 12, 2013

(54) IMPEDANCE-SCANNING QUARTZ CRYSTAL MICROBALANCE

(75) Inventors: Franz Wudy, Warminster (DE); Michael Multerer, Kronach (DE); Georg Schmeer, Pentling/Grossberg (DE); Heiner Jacob Gores, Regenstauf (DE)

(73) Assignee: C3 Prozess-und Analysentechnik GmbH, Haar (DE)

( * ) Notice: Subject to any disclaimer, the term of this patent is extended or adjusted under 35 U.S.C. 154(b) by 419 days.

(21) Appl. No.: 12/741,871

(22) PCT Filed: Nov. 10, 2008

(86) PCT No.: PCT/EP2008/065248
§ 371 (c)(1),
(2), (4) Date: Oct. 7, 2010

(87) PCT Pub. No.: WO2009/060100
PCT Pub. Date: May 14, 2009

(65) Prior Publication Data
US 2011/0022353 A1 Jan. 27, 2011

(30) Foreign Application Priority Data
Nov. 9, 2007 (DE) .......................... 10 2007 053 573

(51) Int. Cl.
| | | |
|---|---|---|
| G01Q 30/00 | (2010.01) | |
| G05B 5/00 | (2006.01) | |
| G01G 9/00 | (2006.01) | |
| G01D 21/00 | (2006.01) | |
| G06F 19/00 | (2011.01) | |
| G06F 17/40 | (2006.01) | |

(52) U.S. Cl.
USPC ............. 702/127; 73/865; 702/187; 702/189; 708/200

(58) Field of Classification Search
USPC ........... 73/104, 105, 570, 579, 580, 649, 651, 73/865, 865.8, 866; 356/600; 702/1, 33, 702/56, 127, 137, 155, 166, 167, 168, 173, 702/187, 189; 708/100, 105, 200
See application file for complete search history.

(56) References Cited

U.S. PATENT DOCUMENTS 2,744,408 A * 5/1956 Seney .............................. 73/580
3,492,858 A * 2/1970 Heflinger et al. ............... 73/580
6,006,589 A * 12/1999 Rodahl et al. ................. 73/54.41

FOREIGN PATENT DOCUMENTS

WO   WO 2006/118899   11/2006
WO   WO 2006/132451   12/2006

OTHER PUBLICATIONS

Buttry, Daniel A., et al., "Measurement of Interfacial Processes at Electrode Surfaces with the Electrochemical Quartz Crystal Microbalance", Chem. Rev., 92 (1992), pp. 1355-1379.
Wegener, Joachim, et al., "The Quartz Crystal Microbalance as a Novell Means to Study Cell-Substrate Interaction in Situ", Cell Biochemistry and Biophysics, 34 (2001), pp. 121-151.
Search Report issued by the International Search Authority for International Patent Application No. PCT/EP2008/065248 on May 27, 2009.

* cited by examiner

Primary Examiner — Edward Cosimano
(74) Attorney, Agent, or Firm — Stein IP, LLC (57) ABSTRACT

Method for detecting a change in mass with a quartz crystal impedance-scanning microbalance, which can be connected to an evaluation device, wherein the quartz crystal microbalance is designed to transmit the measurement points recorded at a predetermined data recording rate as raw data to the evaluation device, including at least the following steps: linearly fitting the measurement points of the raw data to a fractional rational function and determining at least one resonance frequency from the fitted measurement points of the raw data, wherein a change in the at least one resonance frequency corresponds to an effective change in mass.

19 Claims, 6 Drawing Sheets

IMPEDANCE-SCANNING QUARTZ CRYSTAL MICROBALANCE

CROSS-REFERENCE TO RELATED APPLICATIONS

This application is a national stage application of PCT Application No. PCT/EP2008/065248, filed Nov. 10, 2008, in the European Intellectual Property Office, and claims priority to German Application Number DE 10 2007 053 573,4, filed Nov. 9, 2007, the disclosures of which are incorporated herein by reference.

BACKGROUND OF THE INVENTION

1. Field of the Invention

The invention pertains to a method for detecting a change in mass with an impedance-scanning quartz crystal microbalance and to a device for detecting a change in mass.

2. Description of the Related Art

Quartz crystal microbalances (QCM) are known from the prior art as a means of detecting extremely small changes in mass. The core element of a quartz crystal microbalance is a quartz resonator, which can be caused to vibrate at a resonance frequency by the application of an alternating voltage. Because of the high quality of quartz resonators and the associated stability of their frequencies, they are used in many electronic devices as a time standard. Quartz crystal microbalances (QCM) have already been used for some time in the analytical areas of chemistry, biology, electrochemistry, and materials testing.

In 1959, Günter Sauerbrey defined the relationship between the change in frequency of the oscillation of the quartz crystal and the change in the mass density for the first time. The frequency changes in linear fashion with the change in the mass density on the quartz crystal.

Figure 1:
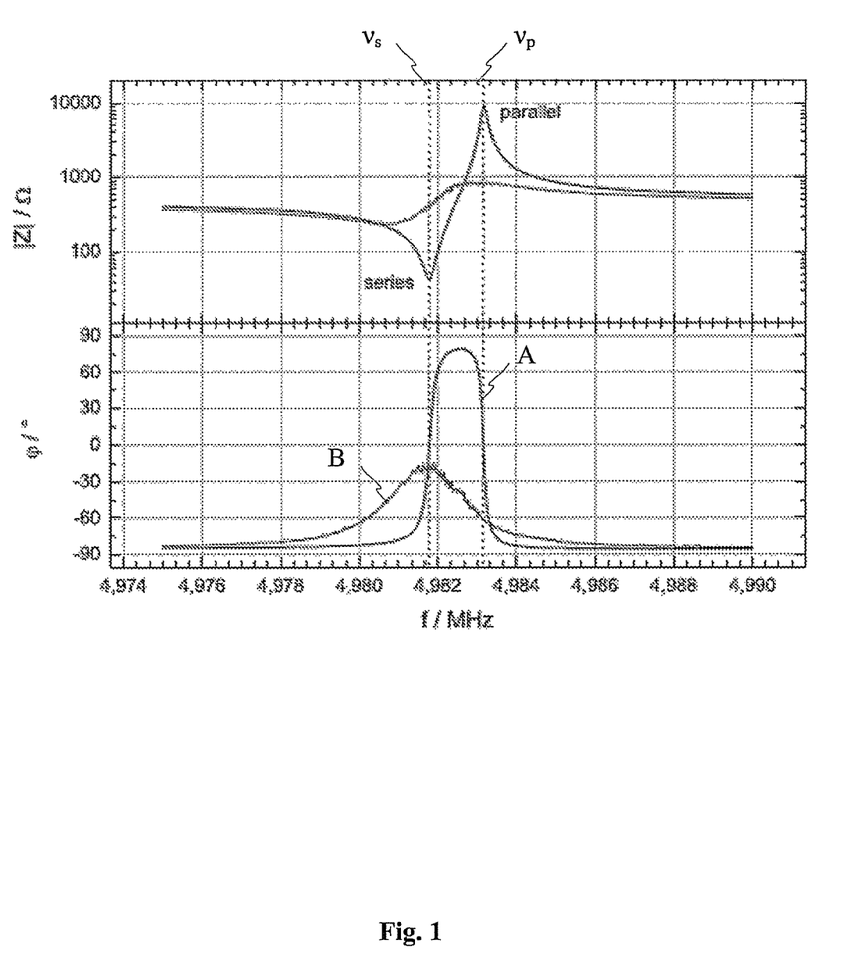
FIG. 1 shows measurement curves of an impedance scan.

There are basically two different types of quartz crystal microbalances in commercial use—first, the oscillator type, and, second, the impedance-scanning type. The quartz crystal microbalance based on the oscillator design consists, in terms of its circuitry, of an electronic oscillator in a free-running configuration, wherein the mass-detecting quartz crystal is used as the frequency-determining component. FIG. 1 shows a typical impedance curve in the form of a Bode diagram for a quartz resonator of this type.

The phase shift from −90° to +90° and back to −90° again is especially easy to see when there is almost no load on the crystal in air. The first shift (with increasing frequency) is found at the so-called series resonance frequency ($v_s$) of the quartz crystal; the second shift occurs at the so-called parallel resonance frequency ($v_p$). The magnitude is either at a global minimum or at a global maximum at these points.

Conventional oscillator circuits like those found in most quartz crystal microbalances require a phase shift through 0° to ensure that they will function electronically in trouble-free fashion. If the quartz crystal is highly damped as a result of having been introduced into a liquid, for example, the dynamics of the phase shift are considerably reduced—the quartz crystal microbalance no longer functions in a mathematically trivial manner. Extensions to encompass the entire shift of the phase position so that a phase shift through 0° takes place again are complicated and subject to error.

It is also often necessary to compensate manually for parasitic capacitance, which is disadvantageous especially when the goal is to perform efficient, automated measurements.

In the undamped case, the resonance frequency, which is determined by frequency measuring devices, is defined in nearly unique fashion by an abrupt change in the phase behavior (compare FIG. 1, curve A).

In the damped case, the slope of the phase shift is flattened considerably (compare FIG. 1, curve B), and the positions of the resonance frequencies lose their unique quality. Parasitic and unavoidable phase shifts caused by the electronic layout also contribute to a decrease in the accuracy of the frequency—the quality of the oscillator is reduced.

Another approach is to measure the change in impedance as shown in FIG. 1. Complicated and accurate electronic devices are required to do this. These can be either known network analyzers or specialized designs. Common to all of them is that the data obtained, such as the magnitude and phase as a function of frequency, must be converted into an analytically evaluatable form.

To do this, a mathematical model of an electronic equivalent circuit, to which the data can be fitted by nonlinear regression, is required. The BvD model (Butterworth-van Dyke equivalent circuit of a quartz resonator) and its modifications are used for this purpose. The disadvantage of this method is that the measurements proceed very slowly, and in some cases several seconds are required per measurement point. This makes in-situ and real-time measurements impossible, especially when several thousand measurement points must be measured to obtain, for example, highly resolved frequency data.

Fitting to the BvD model, furthermore, is highly unreliable and slow because of the methodology of nonlinear approximation. The basic model (BvD model) is subject to a large number of approximations and assumptions. The course of the fit is highly dependent on the starting and ending frequencies (frequency window). When there are up to ten parameters to be fitted and up to 100,000 measurement points, the process takes a great deal of time. In some cases the fit converges poorly or not at all. The quality of the result, furthermore, is very poor. The starting parameters required are very difficult to estimate, because variables which are difficult if not impossible to observe experimentally are contained in them. The positive course of the fit itself is especially dependent on these starting parameters.

This method therefore makes available a large number of interpretable electrical parameters, but it is difficult or impossible to use it to obtain rapid in-situ measurements.

SUMMARY OF THE INVENTION

The goal of the invention is therefore to provide a method and a device for detecting a change in mass, in which, first, the disadvantages known from the prior art are at least partially avoided, and, second, it is possible to perform in-situ and real time measurements Accordingly, under a first aspect of the invention, a method for detecting a change in mass with an impedance-scanning quartz crystal microbalance, which can be connected to an evaluation device, is provided, wherein the quartz crystal microbalance is designed to transmit the measurement points recorded at a predetermined data recording rate as raw data to the evaluation device, wherein the method comprises at least the following steps:

linearly fitting the measurement points of the raw data to a fractional rational function, and determining at least one resonance frequency from the fitted measurement points of the raw data, wherein a change in at least one resonance frequency corresponds to an effective change in mass.

The advantage of linear fitting is that the measurement can be performed much more quickly than in the case of nonlinear fitting, preferably even in real time.

It is advantageous to use, as a fractional rational function, a Padé approximation from the family of Padé approximations:

$$\gamma = \frac{p(v)}{1+Q(v)} = \frac{A_o + A_1 v + A_2 v^2 + \ldots + A_m v^m}{1 + A_{m+1} v + A_{m+2} v^2 + \ldots + A_{m+n} v^n}$$

and to determine the coefficients of the Padé approximation by the least error squares method, applied to the linearized form $$\gamma = p(v) - Q(v) \cdot \gamma$$

of the Padé approximation to determine the coefficients of the Padé approximation.

It has been found to be especially advantageous to use the Padé approximation $$\gamma = \frac{p(v)}{1+Q(v)} = \frac{A_0 + A_1 v + A_2 v^2}{1 + A_3 v + A_4 v^2 + A_5 v^3}$$

The Padé approximations and especially the Padé approximations of order (2, 3) turn out to be especially advantageous with respect to simplicity, speed, and stability.

In one embodiment, the determination of the at least one resonance frequency can comprise the determination of a global maximum and a global minimum from the fitted measurement points, wherein the global maximum corresponds to the parallel resonance frequency and the global minimum to the series resonance frequency.

In an advantageous embodiment, the raw data are transmitted to the evaluation device during the measurement, wherein the linear fitting of the measurement points of the raw data to the fractional rational function and the determination of the resonance frequency are carried out during the measurement.

It is therefore possible to begin with the evaluation of the measurement during the measurement process itself, so that preferably it is even possible for both the measurement and the evaluation to proceed in real time.

The data recording rate can be more than 10,000 measurement points per second, preferably more than 100,000 measurement points per second, and even more preferably more than 500,000 measurement points per second.

In one embodiment, a preview measurement can be conducted before the measurement points of the raw data are fit linearly to a fractional rational function and before the resonance frequency is determined, wherein the resolution and the frequency range for the measurement can be established on the basis of the measurement points of the preview measurement.

It is the especially high data recording rate which makes it possible to provide a preview measurement, because the preview measurement also takes place very nearly in real time.

The measured frequency range can be fitted dynamically during the measurement. The raw data and the linearly fitted measurement points can be presented on a display unit.

Under another aspect of the invention, a device for detecting a change in mass, comprising an impedance-scanning quartz crystal microbalance and an evaluation device which can be connected to it, is provided, wherein the quartz resonator is connected to the quartz crystal microbalance in such a way that it is isolated from direct current.

In a preferred embodiment of the device, the measurement points can be recorded without the associated phase information and amplitude information. This makes it possible to provide raw data at very high data recording rates.

The quartz resonator can comprise a coated quartz resonator, wherein the coating comprises selectively absorbing media, especially polymers.

The data recording rate of the quartz crystal microbalance can be more than 10,000 measurement points per second, preferably more than 100,000 measurement points per second, and even more preferably more than 500,000 measurement points per second.

In one embodiment, the quartz crystal microbalance can be used to control an electroplating process.

The relative impedance-scanning method provided by the invention forges a new path to at least partial avoidance of the disadvantages known from the prior art. Although the method does not yield information of the same high density as the absolute impedance method does, in return a result which is nearly as good in practice is obtained, while simultaneously the data rate is significantly increased. This increase in the data rate is highly advantageous in numerous areas of application in electrochemistry, gas sensor technology, and biochemistry, where rapid measurements are important because of the dynamics of the processes.

Neither the phase nor the absolute magnitude is measured, and this has an especially positive effect on the speed of the measurements. Because of these omissions, the electronic circuitry can be produced at much lower cost than that of commercially available impedance analyzers.

The superiority of the impedance-scanning methods is known. The previously described disadvantages of high cost, low data rate, and long measuring times can be swept aside by the inventive method and the inventive device. With the use of a linear fit for the automated evaluation, there is no longer any need to guess at the starting parameters, which is fraught with error, and the problem of often inadequate convergence is eliminated. Because the amount of computing work is considerably reduced in comparison with that required for nonlinear fitting, a standard commercial computer is all that is needed to evaluate the measurement data.

The proposed fractional rational functions (Padé approximations) are highly suitable for fitting the course of the impedance. Thus more than just the counted, apparent resonance frequency of the first oscillator method is made accessible. In addition, the acquired data are available quickly and reliably.

In summary, the inventive method and the inventive device for detecting a change in mass offer the following advantages over the prior art:

The method and the device are suitable for highly damped quartz crystals.

There is no need to compensate manually for parasitic capacitance (as required in the case of oscillator circuits).

The excitation amplitude can be set from the computer.

The method and the device are suitable for arrays of quartz crystals of different fundamental frequencies (this is not possible in the case of oscillator circuits).

The change in impedance can be monitored during the measurement. This makes it possible to draw conclusions concerning damping and signal quality.

The resonance frequency can be determined by means of software or a software algorithm. The device is thus flexible in its applications (by adapting the software), so that there is no need to make any modifications to the hardware.

A low-cost design with standard components is made possible.

The device is characterized by small dimensions (a circuit board measuring 160×100 mm).

The quartz crystal output is isolated from DC voltage for EQCM measurements.

The measurement device and the evaluation device are connected by a high-speed USB interface with ground breaker.

Graphic control software for intuitive and user-friendly operation can be easily provided.

High measuring speeds are possible (scan rates of up to 500 kS/sec).

A high frequency resolution of approximately 20 mHz is possible.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

Additional details and features of the invention can be derived from the following description in conjunction with the drawings, of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In comparison with the measuring devices known from the prior art, several crucial changes and simplifications are proposed. Phase data are not read out, which greatly simplifies the design. Magnitude data are recorded in proprietary relative units. The quartz crystal is connected to the measuring device in such a way that it is completely isolated from DC voltage, which makes it possible to perform electrochemical measurements (EQCM) without interference. Standards are thus set especially in regard to measuring speed. Thus the unit is connected to the computer by way of a USB interface. The hardware is so highly optimized that a data recording rate of more than 500,000 measurement points per second can be made available. An average measurement across a frequency window of 20 kHz at a frequency step of 0.2 Hz can therefore be made within 200 msec. The raw data are then evaluated in the computer. The entire unit is very compactly and inexpensively accommodated on a DIN-Euro circuit board.

In cases where the measurement requirements can be reduced, such as when only the series resonance frequencies are to be determined or when the frequency resolution for the measurements is reduced, the acquisition time can be decreased even more.

Figure 2:
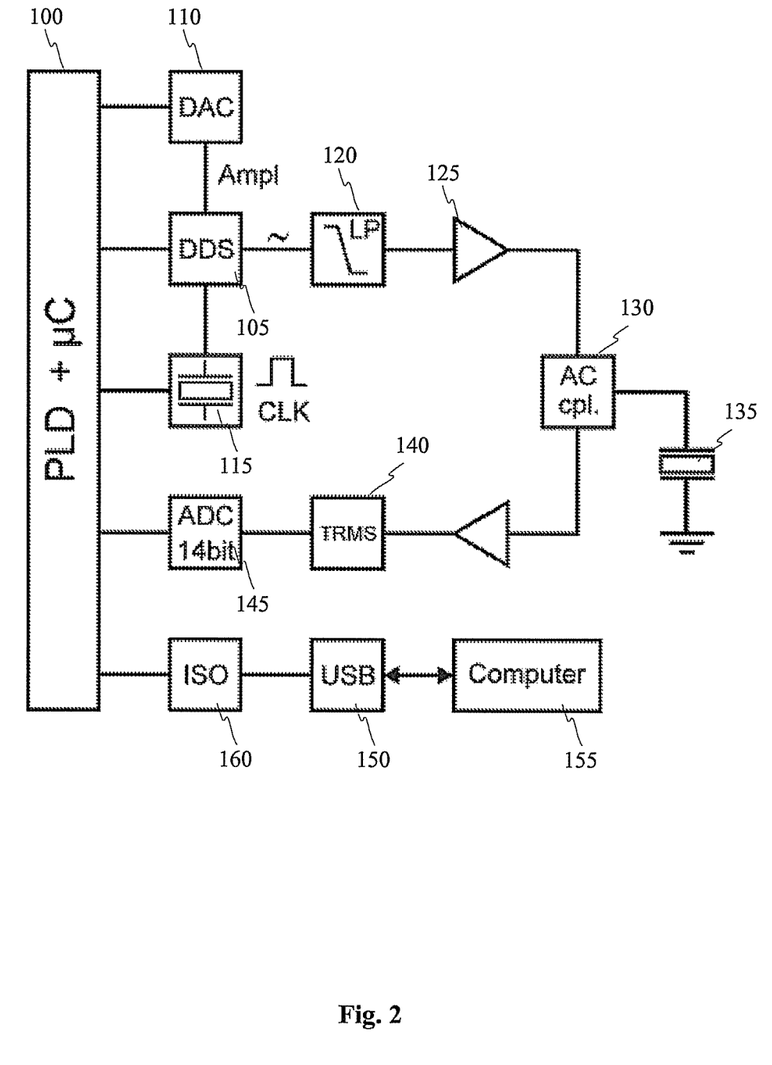
FIG. 2 shows a block circuit diagram of an embodiment of a quartz crystal microbalance.

FIG. 2 shows, by way of example, the design of an embodiment of a quartz crystal microbalance in the form of a block circuit diagram. As can be seen, a programmable logic component PLD (100), designed as a single-chip component, represents the core of the quartz crystal microbalance. The programmable logic component PLD (100) is connected to a freely programmable DDS synthesizer (105) to control the frequency swing. The DDS synthesizer (105) makes a sine oscillation available at its output. By means of a simple digital-analog converter DAC (110), the amplitude of the output signal can be set to any one of 4,096 steps between 0.05 and 8.33 $V_{rms}$.

The logic component PLD (100) and the DDS synthesizer (105) are each operated at a clock rate of 80 MHz, wherein the clock pulse is provided by the clock generator CLK (115). The DDS synthesizer (105) is connected on the load side to a low-pass filter LP (120) of the fourth order with a limit frequency of 10 MHz or 15 MHz. Low-pass filters (120) with higher limit frequencies such as 20 MHz or 25 MHz or more, for example, can also be used.

The sine oscillation thus produced, the frequency (between 1 MHz and 10 MHz or 15 MHz) and amplitude of which are variable, is amplified by an operational amplifier (125) with current feedback. The signal is coupled to the quartz crystal (135) by the use of an AC-connected network (130) of moderate impedance.

The signal is coupled out again by the network (130) and sent to a frequency-voltage converter (140) by way of another operational amplifier. The logarithm of the impedance behavior of the quartz crystal (135) is determined by the use of the frequency-voltage converter (140), which is preferably of single-chip design and is linear over the entire frequency range, in combination with a low-pass filter, and the result is transmitted to a 14-bit analog-digital converter ADC (145).

The logic component PLD (100) receives the data thus acquired from the analog-digital converter ADC (145), determines the arithmetic mean of at least two measurement points at each frequency step, and transmits the data to a USB controller (150), which in turn sends the data to a computer (155). A bus isolator ISO (160) prevents the USB controller (150) and the USB interface from being coupled to ground during the data transmission.

An additional microcontroller μC performs higher-level processes such as calculating the starting and stopping frequencies, calculating the width of the frequency steps, and monitoring and controlling the logic component PLD (100).

A runtime-optimized computer program (which can be written in the programming language C) running on the computer (155) collects the data transmitted to the computer (155) and executes an integrity check as the first step. Then the data acquired from the hardware (as a preview measurement) are displayed to the user by the computer program.

After a preview measurement, the possibility of increasing the measurement resolution and of adjusting the starting and/or stopping frequency is made available to the user, so that a so-called "region of interest" (ROI) can be measured at high resolution. When several quartz crystals with different resonance frequencies are used, the ROI can be defined for each quartz crystal as a function of the associated resonance frequency. Thus the measurement values of different quartz crystals can be differentiated from each other, which means that parallel measurements with different quartz crystals are possible.

Then the series and resonance frequencies are determined by performing a linear fit to allow an analytical. interpretation of the results. For this purpose, the measurement values are fitted to a fractional rational function, preferably to a Padé approximation from the family of Padé approximations (Equation 1):

$$y = \frac{p(v)}{1+Q(v)} = \frac{A_o + A_1 v + A_2 v^2 + \ldots + A_m v^m}{1 + A_{m+1} v + A_{m+2} v^2 + \ldots + A_{m+n} v^n} \quad \text{(Equation 1)}$$

It has been found to be especially advantageous to fit the measurement values to the Padé approximation of the order (2, 3):

$$y = \frac{p(v)}{1+Q(v)} = \frac{A_0 + A_1 v + A_2 v^2}{1 + A_3 v + A_4 v^2 + A_5 v^3} \quad \text{(Equation 2)}$$

This Padé approximation (Equation 1 or Equation 2) can be linearized to:

$$y = p(v) - Q(v) \cdot y \quad \text{(Equation 3)}$$

By using the method of least error squares, the coefficients of Equation 2 can then be obtained from Equation 3. Then the minimum $v_s$ and the maximum $v_p$ are determined, wherein $v_s$ is the series resonance frequency and $v_p$ the parallel resonance frequency.

It has been found that a fractional rational function gives especially good results with respect to the residual behavior.

Thus, for example, the function from Equation 2 is able to combine simplicity, speed, and stability. Because a linear method is used, no starting parameters are needed. The fit always converges and, in contrast to nonlinear methods, it always converges at the same speed, which results in a uniform data rate.

Experiments with a typical computer system have shown that a fit with 100,000 data sets takes about 12 msec. The minimum ($v_s$) and the maximum ($v_p$) are determined from that by forming the corresponding derivatives. The parameters and the associated error of the fit are plotted. A reduced quality parameter $\hat{Q} = v_p / v_s$ provides information on the width of the region of interest ROI and makes further analytical estimates possible.

Figure 3:
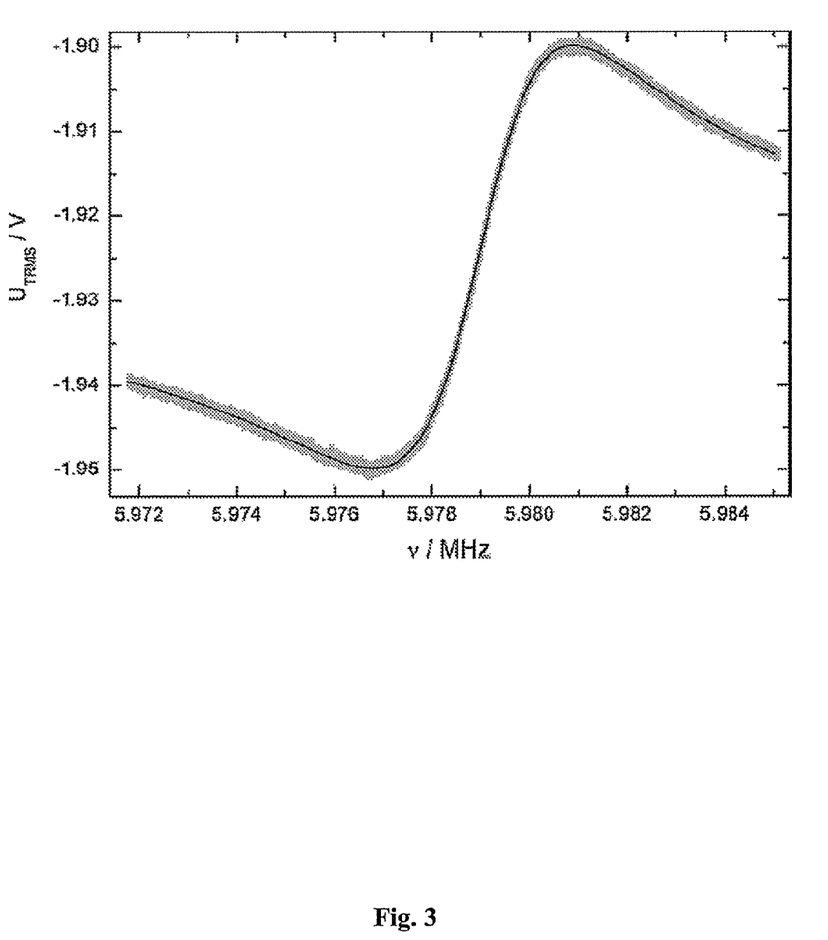
FIG. 3 shows an example of an impedance scan with a fitted curve.

FIG. 3 shows an example of an impedance scan of a curve, which was fitted linearly on the basis of Equation 3. In this example, a statistical significance of $\chi^2 = 1 \cdot 10^{-7}$ was calculated for the fit. In addition, another nonlinear fit corresponding to Equation 2 was performed, wherein the parameters of the linear fit were used.

It was found that the values of $\chi^2$ for the two fits differed from each other by no more than 6%.

A comparison of the linear fit with the nonlinear fit shows that the deviation between the frequencies is on the order of a tenth of a percent and that it is statistically distributed over the entire measurement period. The considerable time advantage of the linear method over the nonlinear method in the performance of the measurements outweighs the negligible errors of the linear method.

In the following, the application of the inventive device and method is described on the basis of the deposition of silver (electroplating) as an example.

A solution of 0.15 M $AgNO_3$ and 1 M $KNO_3$, acidified with $HNO_3$, was used. The cell which was used was of original design with a 0.55-inch quartz crystal at the bottom. The crystal was a commercially obtainable quartz crystal with a layer of gold deposited from the vapor phase and with a fundamental resonance frequency of 6 MHz. A silver wire immersed in the solution was used as a reference electrode, and a Pt ring electrode was used as the counterelectrode. Electroplating was carried out with a potentiostat with the typical 3-electrode arrangement. The potential was varied, corresponding to the CV [cyclic voltammetry] experimental procedure, between a starting value of +0.05 V vs Ref. and an ending value of −0.30 V vs. Ref. at a rate of advance of 10 mV/s.

Figure 4:
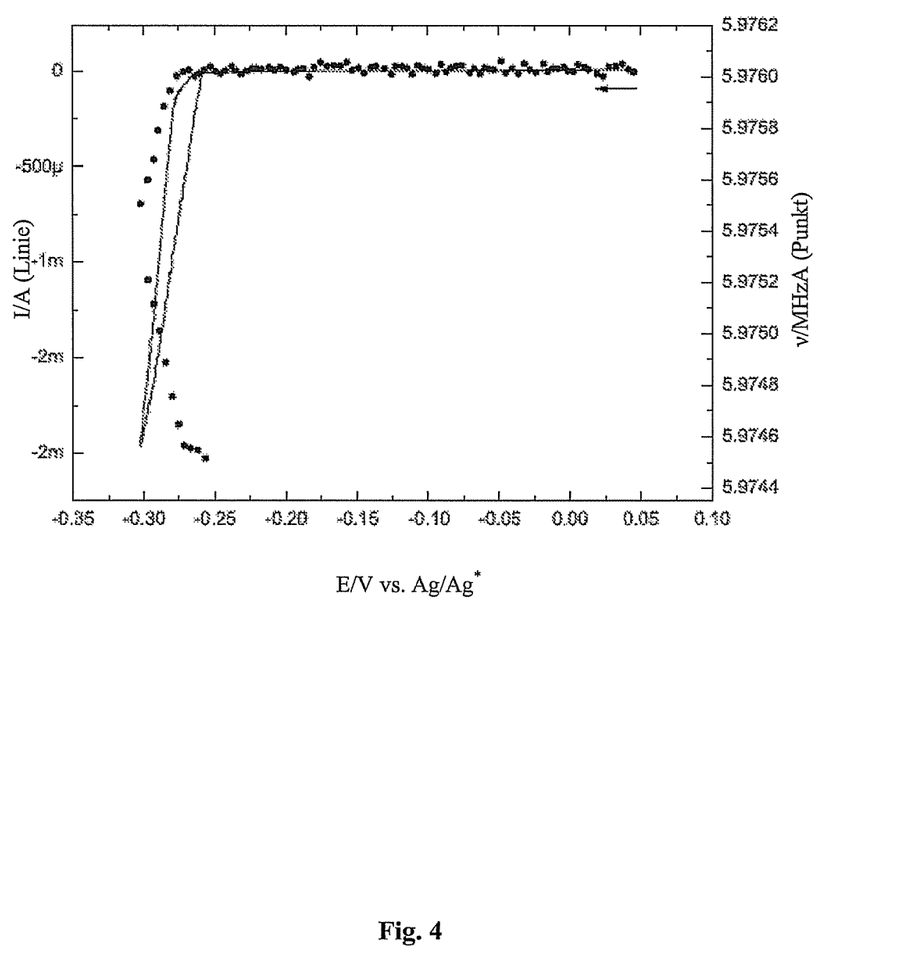
FIG. 4 shows a combined plot of a cyclic voltammogram (Ag on gold)

FIG. 4 shows a combined plot of a cyclic voltammogram in the cathodic direction and the resonance frequency of the quartz crystal. No change in the current can be seen up to a potential of −0.26 V vs. Ref.; the resonance frequency remains, as expected, within the range of the measurement accuracy.

Figure 5:
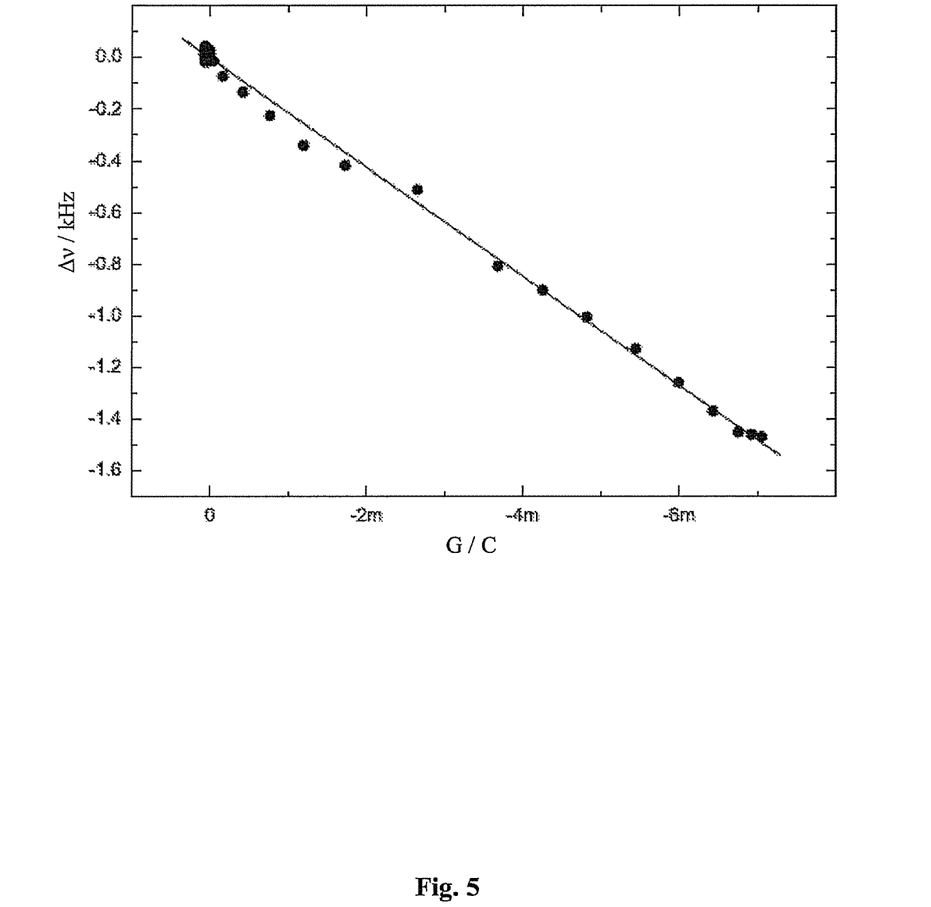
FIG. 5 shows the linear relationship between charge quantity and resonance frequency according to FIG. 4.

As soon as the deposition begins, as evidenced by the [drop in the] cathodic current to −2 mA, the resonance frequency falls by about 1500 Hz, which means that an effective increase in mass has occurred. FIG. 5 shows the change in the resonance frequency in relationship to the charge quantity Q. The charge quantity is determined by numerical integration of the current over time. According to Faraday's law, we would expect a mass increase of $\Delta m = Q/M$, wherein M is the molar mass of silver (107.9 g/mol). In similar fashion. Sauerbrey's law $\Delta v = -C \Delta m$ applies as the sensitivity parameter.

The plot of $\Delta v$ against Q in FIG. 5 shows the expected linear relationship. The residual behavior of the fitting process leads to a $\chi^2$ in the range of $10^{-8}$-$10^{-6}$, it is therefore possible to achieve a very good fit.

The invention therefore provides the following:

An impedance-scanning (E)QCM, connected to a computer system for evaluation, which fits the raw data linearly to a fractional rational function.

The function $$y = \frac{A_0 + A_1 v + A_2 v^2}{1 + A_3 v + A_4 v^2 + A_5 v^3}$$

is preferably used for this.

Figure 6:
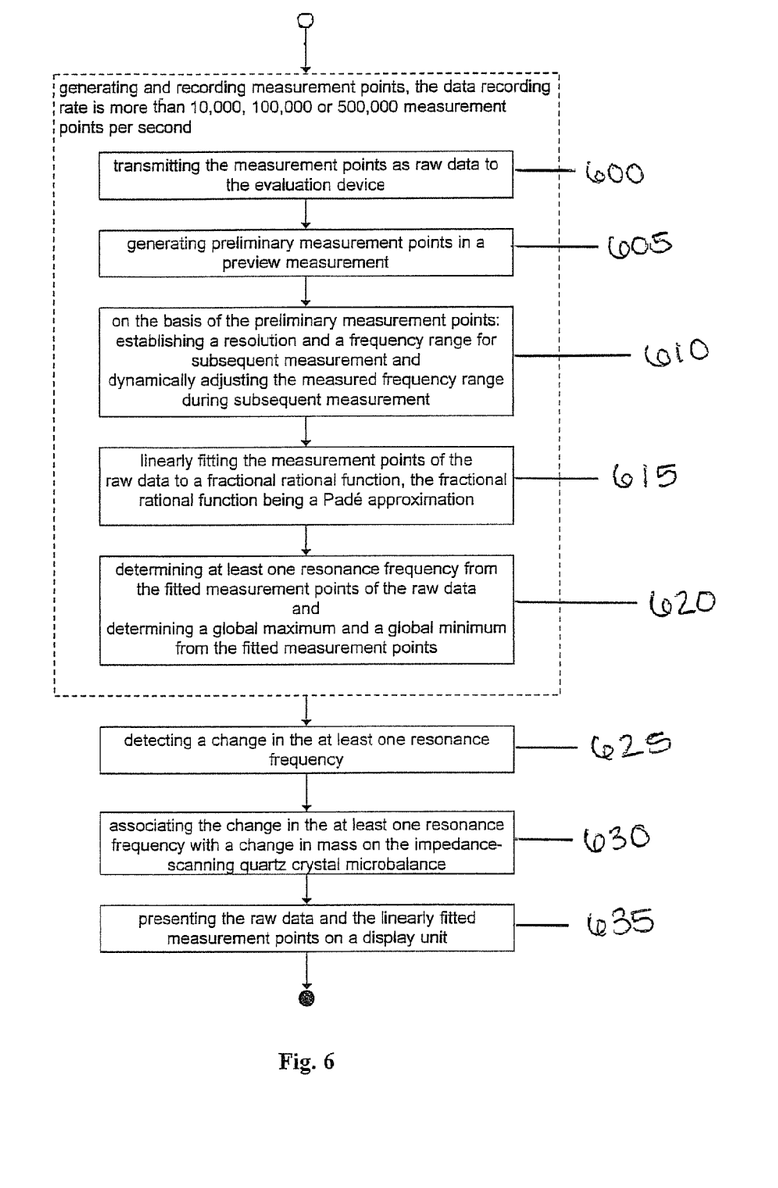
FIG. 6 shows a process of generating and recording measurement points to be displayed on display unit.

FIG. 6 shows a process for generating and recording measurement points, using the scanning quartz crystal microbalance, to be displayed on a display unit, the data recording rate possibly being more than 10,000, 100,000, or even 500,000 measurement points per second.

In operation 600, the transmitting of the measurement points as raw data to the evaluation device is performed. Generating of preliminary measurement points in a preview measurement is performed in operation 605. On the basis of the preliminary measurement points, the establishing of a resolution and a frequency range for subsequent measurement and dynamically adjusting the measured frequency range during subsequent measurement is performed in operation 610.

In operation 615, linearly fitting the measurement points of the raw data to a fractional rational function, where the fractional function is a Padé approximation, is performed. Then, determining at least one resonance frequency from the fitted measurement points of the raw data and determining a global maximum and a global minimum from the fitted measurement points is performed in operation 620.

In operation 625, detecting a change in the at least one resonance frequency is performed. In operation 630, associating the change in the at least one resonance frequency with a change in mass on the impedance-scanning quartz crystal microbalance is performed. And then, presenting the raw data and the linearly fitted measurement points on a display unit is performed in operation 635.

In an especially advantageous embodiment, the quartz crystal microbalance comprises dimensions of less than 722 cm$^3$, which means that measurements can be carried out in glove compartments.

In an embodiment of the invention, the fit being used can be obtained during the course of the measurement, which makes it possible to use the impedance-scanning method in-situ, preferably at a data rate of more than 2 measurements per second with a measurement data density of more than 1,000 points.

The frequency range to be measured is preferably adjusted dynamically during the measurement on the basis of the results of the most recent fit.

The (E)QCM is preferably optimized with respect to production costs, which is accomplished by reducing the complexity of the electronic circuitry to a minimum and by omitting an absolute determination of the magnitude data.

In one embodiment, the production cost optimization of the (E)QCM can be accomplished by completely eliminating the phase data, which has the effect of reducing the complexity of the electronic circuitry to a minimum.

In one embodiment, the production cost optimization of the (E)QCM can be accomplished by providing software-supported evaluation outside the unit, which has the effect of reducing the complexity of the electronic circuitry to a minimum and which also means that the overall system becomes more flexible.

In an advantageous embodiment of the QCM and the EQCM, it is possible to measure highly damped systems in automated fashion.

It is preferable to use coated quartz crystals, which make it possible to analyze the gas phase. Any selectively absorbing medium is suitable as a coating, including polymers which can be applied electrochemically and ionic fluids with low vapor pressure, which can be applied directly and which, like the polymers, comprise a wide range of possible structural variations, so that the adsorption of the components of the gas phase can be controlled selectively.

In an advantageous embodiment, an electroplating process (galvanic deposition) can be controlled during operation and the deposition conditions can be monitored continuously.

As noted previously, in an embodiment, the quartz crystal microbalance comprises dimensions of less than 722 cm$^3$, which means that measurements can be carried out in glove compartments.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for detecting a change in mass on an impedance-scanning quartz crystal microbalance having a quartz resonator and, is connected to an evaluation device, wherein the quartz crystal microbalance generates and records measurement points corresponding to impedance of the quartz resonator over a pre-established range of frequencies at a predetermined data recording rate and transmits the measurement points as raw data to the evaluation device, comprising the following steps:
   a) linearly fitting the measurement points of the raw data to a fractional rational function,
   b) determining at least one resonance frequency from the fitted measurement points of the raw data,
   c) detecting a change in the at least one resonance frequency, and
   d) associating the change in the at least one resonance frequency with a change in mass on the impedance-scanning quartz crystal microbalance.

2. The method according to claim 1, wherein the step of determining at least one resonance frequency further comprises determining a global maximum and a global minimum from the fitted measurement points, wherein the global maximum corresponds to a parallel resonance frequency and the global minimum corresponds to a series resonance frequency.

3. The method according to claim 1, wherein the raw data are transmitted to the evaluation device during the generation of measurement points, and wherein the linear fitting of the measurement points of the raw data to the fractional rational function and the determination of the resonance frequency are performed during the generation of the measurement points.

4. The method according to claim 1, wherein the data recording rate is more than 10,000 measurement points per second.

5. The method according to claim 1, further comprising presenting the raw data and the linearly fitted measurement points on a display unit.

6. The method according to claim 1, wherein the data recording rate is more than 100,000 measurement points per second.

7. The method according to claim 1, wherein the data recording rate is more than 500,000 measurement points per second.

8. The method according to claim 1, wherein a Padé approximation from the family of Padé approximations $$y = \frac{p(v)}{1+Q(v)} = \frac{A_0 + A_1 v + A_2 v^2 + \ldots + A_m v^m}{1 + A_{m+1} v + A_{m+2} v^2 + \ldots + A_{m+n} v^n}$$

is the fractional rational function, and the coefficients of the Padé approximation are determined by the method of least error squares, applied to the linearized form $$y = p(v) - Q(v) \cdot y$$

of the Padé approximation.

9. The method according to claim 8, wherein the Padé approximation $$y = \frac{p(v)}{1+Q(v)} = \frac{A_0 + A_1 v + A_2 v^2}{1 + A_3 v + A_4 v^2 + A_5 v^3}$$

is the fractional rational function.

10. The method according to claim 1, further comprising, before linearly fitting the measurement points of the raw data to a fractional rational function and before determining at least one resonance frequency: generating preliminary measurement points in a preview measurement, and on the basis of the preliminary measurement points of the preview measurement, establishing a resolution and a frequency range for subsequent measurement.

11. The method according to claim 10, further comprising dynamically adjusting the measured frequency range during subsequent measurement.

12. A device for detecting a change in mass, comprising an impedance-scanning quartz crystal microbalance having a quartz resonator, and an evaluation device connected to said impedance-scanning quartz crystal microbalance, wherein the quartz resonator is connected to the impedance-scanning quartz crystal microbalance in such a way that the quartz resonator is isolated from DC voltage.

13. The device according to claim 12 designed in such a way that the measurement points can be recorded without phase data and without amplitude data.

14. The device according to claim 12, wherein the quartz crystal microbalance has a data recording rate of more than 10,000 measurement points per second.

15. The device according to claim 12, designed for controlling an electroplating process.

16. The device according to claim 12, wherein the quartz crystal microbalance has a data recording rate of more than 100,000 measurement points per second.

17. The device according to claim 12, wherein the quartz crystal microbalance has a data recording rate of more than 500,000 measurement points per second.

18. The device according to claim 12, wherein the quartz resonator comprises a coated quartz resonator.

19. The device according to claim 18, wherein the coated quartz resonator has a coating comprising selectively absorbing polymeric media.

\* \* \* \* \*